United States Patent [19]
Bell et al.

[11] Patent Number: 4,943,619
[45] Date of Patent: Jul. 24, 1990

[54] POLYCARBONATE-EPOXY POLYMER

[75] Inventors: James P. Bell, Storrs, Conn.; Yunzhao Yu, Beijing, China

[73] Assignee: The University of Connecticut, Storrs, Conn.

[21] Appl. No.: 286,529

[22] Filed: Dec. 19, 1988

[51] Int. Cl.$^5$ .............................................. C08F 283/02
[52] U.S. Cl. .................................... 525/463; 525/523; 428/412; 428/413
[58] Field of Search ................ 525/463, 523, 903, 930; 528/370; 428/412

[56] References Cited

U.S. PATENT DOCUMENTS

| | | | |
|---|---|---|---|
| 3,098,056 | 7/1963 | Schnell | 525/463 |
| 3,220,974 | 11/1965 | Fox | 525/462 |
| 3,258,356 | 6/1966 | Caldwell et al. | 525/463 X |
| 3,261,808 | 7/1966 | Schnell | 525/463 X |
| 3,567,686 | 3/1971 | White et al. | 525/462 X |
| 3,971,627 | 6/1975 | Breslow | 8/115.5 |
| 4,130,549 | 12/1978 | Ueno | 528/93 |
| 4,208,488 | 6/1980 | Kraft et al. | 525/107 |
| 4,383,101 | 5/1983 | Olsen et al. | 528/93 |
| 4,746,725 | 5/1988 | Evans et al. | 528/370 |
| 4,766,184 | 8/1988 | Hefner, Jr. | 525/463 |

OTHER PUBLICATIONS

"A Novel Reaction of Epoxy Resins with Polyfunctional Active Esters" Journal of Applied Polymer Science, vol. 2821-2831 (1987).

"A Novel Insertion Reaction of Epoxy Compounds Into the Pendant Ester Linkage of Poly[4-(4-Nitrobenzoyloxy)styrene]" Makromol. Chem., Rapid Commun. 7, 179-181 (1986).

"New Thermo-Crosslinking Reactions of Copolymers of Phenyl Methacrylates by Use of Polyfunctional Epoxy Compounds" Makromol. Chem. 188, 799-809 (1987).

"Novel Synthesis of Self-Sensitized Photosensitive Polymers by Addition Reaction of Pendant Epoxide Groups in the Polymer with Some Cinnamic Esters" Polymer Journal, vol. 16, No. 4, pp. 371-373 (1984).

"Addition Reactions of Pendant Epoxide Group in Poly(glycidylmethacrylate) with Various Active Esters" Journal of Polymer Science: Part A: Polymer Chemistry vol. 24, 1695 (1986).

"New Thermo-Crosslinking Reactions of Polymers Containing Pendant Epoxide Groups with Various Polyfunctional Active Esters" Journal of Polymer Science: Part A: Polymer Chemistry, vol. 25, 1339-1351 (1987).

"Study of Photopolymers, XXX, Syntheses of New Di(meth)acrylate Oligomers by Addition Reactions of Epoxy Compounds with Active Esters" Journal of Polymer Science: Part A: Polymer Chemistry, vol. 25, 3049-3062 (1987).

"New Ring Opening Reactions of Oxiranes with Aryl Carboxylates" Bulletin of the Chemical Society of Japan, vol. 52, (5), 1488-1492 (1979).

Primary Examiner—Theodore E. Pertilla
Attorney, Agent, or Firm—Fishman, Dionne & Cantor

[57] ABSTRACT

A polycarbonate-epoxy polymer and method of making the same is presented. In accordance with the present invention, epoxide groups of epoxy resins react with in-chain carbonate groups of a polycarbonate in the presence of a catalyst to form a polycarbonate-epoxy polymer. When diepoxides and polycarbonates are reacted, the product produced is a three-dimensional network of chains cross-linked with carbonate groups. The cross-link density is controlled by adjusting the epoxy-carbonate ratio. The preferred catalyst comprises quarternary ammonium salts with tertiary amine and alkoxide catalyst being less preferred.

26 Claims, 1 Drawing Sheet

POLYCARBONATE-EPOXY POLYMER

BACKGROUND OF THE INVENTION

The invention relates generally to polycarbonate-epoxide polymers and a method of making the same. More particularly, this invention relates to a polycarbonate-epoxide polymer made from the reaction of oligomeric or polymeric carbonate groups with mono or multifunctional epoxides in the presence of a catalyst, preferably quarternary ammonium salts.

Polycarbonates are well known engineering thermoplastics having high performance characteristics. Polycarbonates are tough, rigid, dimensionally stable and have outstanding impact strength. It will be appreciated that polycarbonate polymers are widely used as glazing materials because of their clarity and toughness. Unfortunately, such optically clear sheets and other articles of polycarbonate can be rather easily scratched and marred.

This problem may be overcome by applying a protective coating over the polycarbonate made from a harder, more mar resistant material such as epoxy. It would be particularly advantageous to effect chemical bonding between the epoxy cover layer and the polycarbonate base so as to form a polycarbonate-epoxide polymer. In addition, such polycarbonate-epoxy polymers would be exPected to exhibit unusual combinations of ductility, toughness and temperature resistance. However, polycarbonate epoxide polymers of this type have never been commercialized although various attempts have been made to combine polycarbonates and epoxy resins.

U.S. Pat. No. 4,746,725 to Evans et al discloses the preparation of a cyclic polycarbonate-polyepoxide product. Evans et al discloses the reaction at an elevated temperature, in the presence of a polycarbonate formation catalyst, of a composition comprising cyclic polycarbonate oligomers with at least one polyepoxy compound.

U.S. Pat. No. 3,098,056 to Schnell et al discloses a thermoset composition prepared from linear polycarbonates and epoxy polymers. Similarly, U.S. Pat. No. 3,220,974 to Fox relates to epoxidized polycarbonate compositions containing dihydric phenol as a constituent thereof. U.S. Pat. No. 3,261,808 to Schnell et al also relates to the preparation and curing of polycarbonates containing epoxy end groups.

U.S. Pat. No. 3,258,356 to Caldwell et al describes a coating material comprised of an admixture of cured epoxy resin and polycarbonate resin.

SUMMARY OF THE INVENTION

The above-discussed and other problems and deficiencies of the prior art are overcome or alleviated by the polycarbonate-epoxy polymer and method of making the same of the present invention. In accordance with the present invention, epoxide groups of epoxy resins react with in-chain carbonate groups of a polycarbonate in the presence of a catalyst to form a polycarbonate-epoxy polymer. When diepoxides and polycarbonates are reacted, the product produced is a three-dimensional network of chains cross-linked with carbonate groups. The cross-link density is controlled by adjusting the epoxy/carbonate ratio.

The preferred catalyst used in the method of the present invention comprises quarternary ammonium salts with tertiary amine and alkoxide catalysts being less preferred.

The polycarbonate-epoxy polymer system of the present invention combines the excellent mechanical properties of epoxy resins with the high toughness of polycarbonate. An important feature of this invention is that chemical bonds are formed between the polycarbonate and epoxy. Thus, the present invention will find excellent utility as a coating to increase the mar resistance of polycarbonate in such applications as window panels, molded windshields, safety glasses, etc.

The above-discussed and other features and advantages of the present invention will be appreciated and understood by those of ordinary skill in the art from the following detailed description and drawings.

DESCRIPTION OF THE PREFERRED EMBODIMENT

Figure 1:
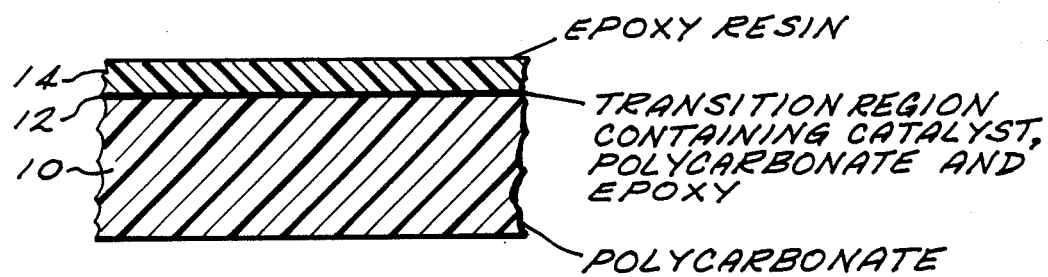
FIG. 1 is a cross-sectional elevation view of a polycarbonate sheet having a coating of epoxy resin chemically bonded thereto in accordance with the present invention.

In accordance with the present invention, it has been discovered that in a catalytic reaction between polycarbonates and epoxy resins, the in-chain carbonate groups in the polycarbonate react with oxirane groups of the epoxy to produce molecular bonds between the epoxy resin and polycarbonate hence forming a polycarbonate-epoxy polymer. When a diepoxide resin is utilized, the result is a three-dimensional network of chains cross-linked with carbonate groups. This discovery was surprising and unexpected as it was generally believed that the reaction of polycarbonates with excess epoxy resin would yield epoxy-capped polycarbonate oligomers (as in much of the prior art described above in the Background Section). Instead however, in accordance with the present invention, the oxirane group of the epoxy bonded to in-chain carbonate groups of the polycarbonate.

In general, the method of the present invention involves the reaction of oligomeric or polymeric carbonate groups with the mono or multifunctional epoxides (preferably in a one to two mole ratio) in the presence of a suitable catalyst to produce a high yield of a polymer wherein the carbonate groups have chemically bonded to the oxirane qroups:

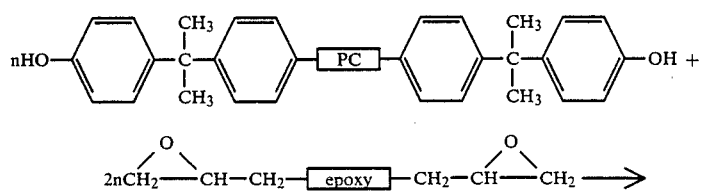

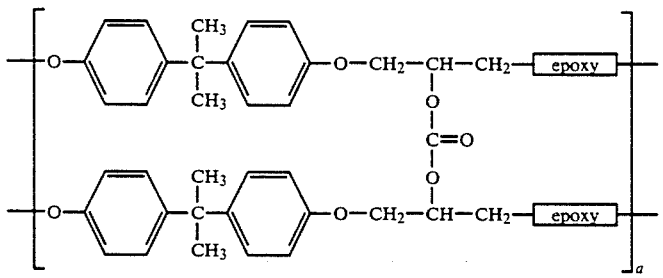

In order to determine that the carbonate groups of the polycarbonate react with oxirane groups of the epoxy resin, an experiment was conducted using diphenyl carbonate as a model compound. As shown by DSC scanning in the absence of catalyst, diphenyl carbonate did not react with epoxy resin. However, in the presence of the quarternary ammonium salt Benzyltrimethylammonium chloride (BTMAC) (0.2 phr), the aromatic carbonate was very reactive with an exotherm beginning at 110° C., and an exothermic peak at 170° C.

The molar ratio of the carbonate group participating in the reaction with oxirane groups was determined by measuring the epoxy consumption. The reaction of diphenyl carbonate with Epon 828 was conducted at 120° C. for 1 h. The completion of the reaction was indicated by the disappearance of the exothermic peak in the DSC scans. These results are given in Table I. It was found that each diphenyl carbonate molecule consumes approximately two oxirane groups.

TABLE 1

| Reaction of Diphenyl Carbonate with Epon 828 | | |
| --- | --- | --- |
| Reactant | Diphenyl carbonate | 0.6431 g |
|  | Epon 828 | 5.9905 g |
|  | BTMAC | 0.0105 g |
| Epoxy Value | After the reaction | 3.78; 3.80 meq/g |
|  | Control (without DPC) | 5.18; 5.16 meq/g |
| Oxirane groups consumed per carbonate group |  | 2.11; 2.19 |

To determine the structure of the reaction product, epichlorohydrin was used as a model compound. BTMAC (0.02% wt.) was used as a catalyst for the reaction, and the mole ratio of epichlorohydrin to diphenyl carbonate was 6:1. After refluxing at 120° C. for 1 h, the product was washed with distilled water and the excess epichlorohydrin was removed by distillation in vacuo. The yield was 93% based upon diphenyl carbonate. The reaction is believed to be of an addition-coupling type:

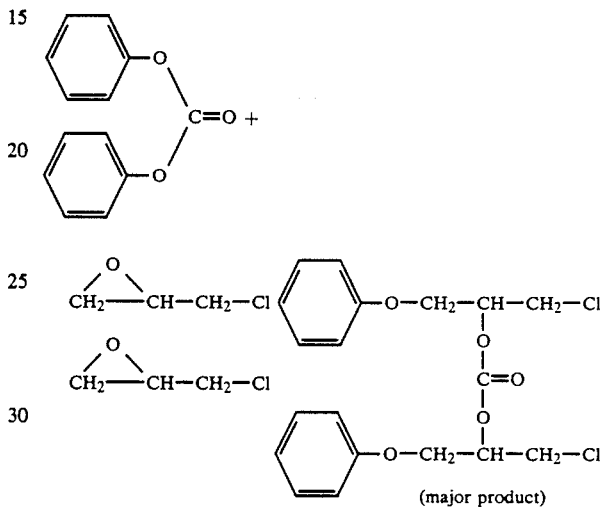

The molecular weight of the product was 442 as determined by vapor pressure osmometry (theor. 399). In the NMR spectrum, the ratio of the adsorption area of the aromatic proton to that of $-CO_2-\overline{CH}-$ proton at 5.1-5.2 ppm was 62:12 or approximately $\overline{5:1}$.

The addition-coupling reaction of aromatic carbonate with epoxides can be catalyzed by quarternary ammonium salt, tertiary amines, or metal alkoxides DSC scan comparisons show that tertiary amines are the most active in catalyzing the reaction, while metal alkoxides are the least effective. These two types of compounds also cause the polymerization of the oxirane group at the same time.

Quarternary ammonium salts such as BTMAC and tetrabutyl ammonium idodide are effective catalysts for the addition-coupling reaction. The catalyzed reaction goes smoothly at moderate temperature (80°-120° C.). The self-polymerization of the oxirane group is negligible in the presence of a quarternary ammonium salt.

Primary amines such as methylene dianiline (MDA) do not effectively catalyze the reaction between aromatic carbonate and epoxides.

Since the aromatic carbonate group easily reacts with epoxy groups in the presence of a catalyst, it is impossible under these circumstances to obtain epoxy-capped polycarbonate oligomers through reacting phenol-terminated polycarbonate with excess epoxy resin. Instead, a network will be formed if the functional groups are in correct stoichiometric ratio. When a Bisphenol A type polycarbonate is used to react with Bisphenol A diglycidyl ether, a phenoxy polycarbonate copolymer network can be obtained, which has a structure of phenoxy resin cross-linked though carbonate groups as shown.

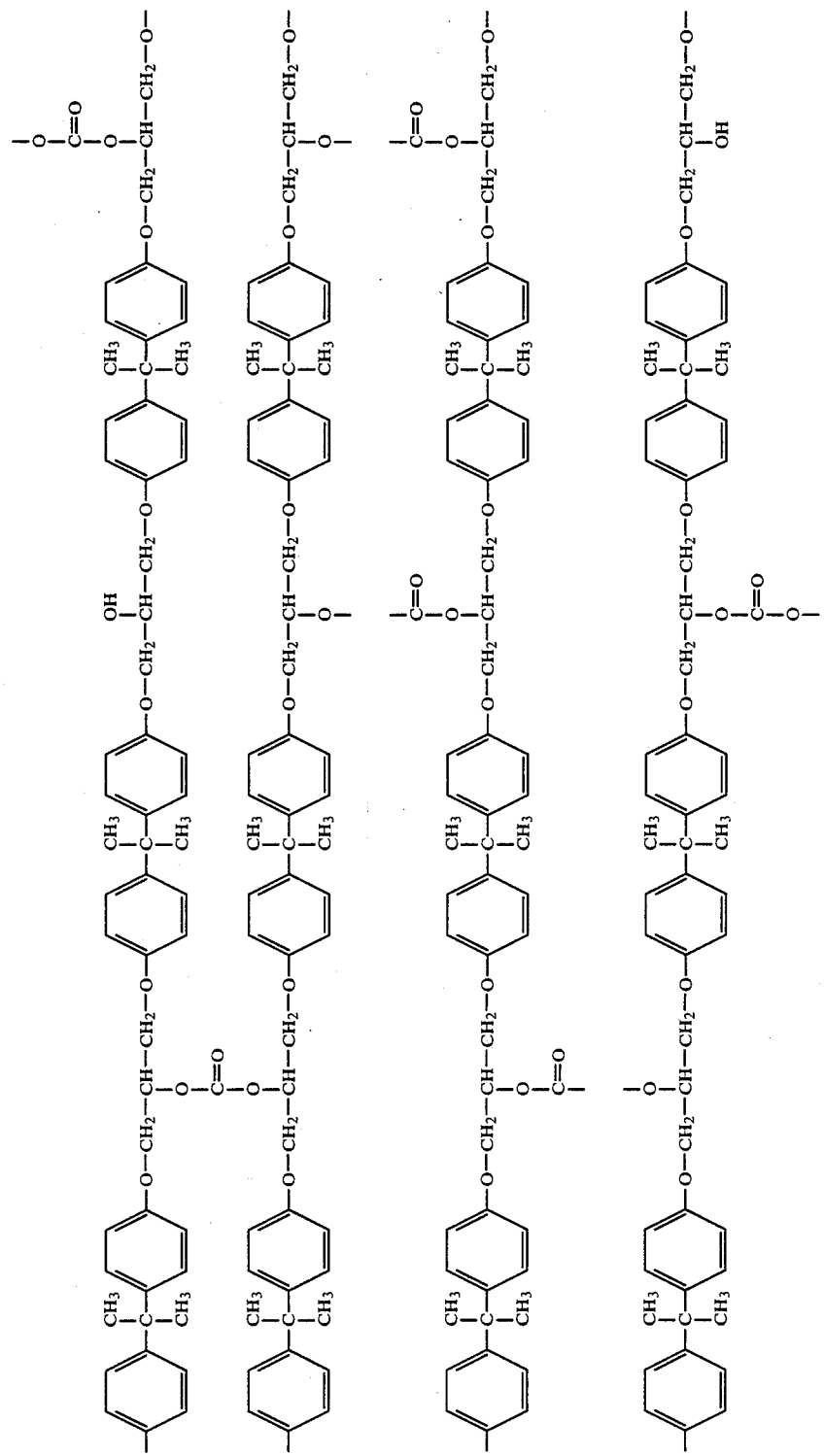

To demonstrate the stoichiometry of the epoxide polycarbonate copolymer, networks, a Polycarbonate oligomer (prepared by transesterification of diphenyl carbonate with bisphenol A), having a number average molecular weight of 600, was used to react with Epon 828 in different ratios BTMAC (0.2 phr) was used to catalyze the reaction. The curing was conducted at 120° C. for 1 h and 160° for 4 h. The copolymer networks were characterized in terms of glass transition temperature. As could be expected, when the ratio of the reactants was calculated according to one oxirane group for one phenol group and two oxirane groups for one carbonate group, the highest crosslink density is achieved as shown in TABLE II. In this case, the $T_g$ of the copolymer network was much higher than that of the linear phenoxy resins:

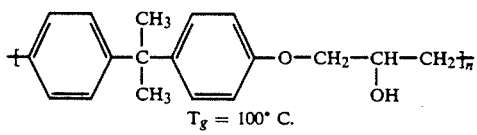

$T_g = 100°$ C.

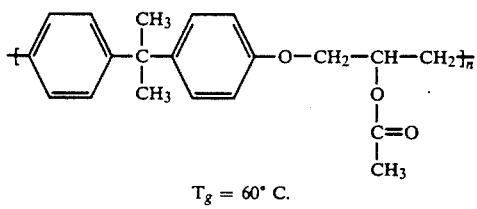

$T_g = 60°$ C.

TABLE II

| $T_g$ of Phenoxy Polycarbonate Copolymer Networks | | | |
|---|---|---|---|
| Stoichiometric ratio of Epon 828/Polycarbonate | | | |
| 110/67 | 100/90 | 100/100 | 100/110 |
| $T_g$(°C.) 75 | 85 | 123 | 73 |

It is believed that the present invention will find many applications when produced as a three-dimensional network of multifunctional epoxide chains cross-linked with carbonate groups. This resulting polycarbonate-epoxy polymer would have excellent ductility, toughness and temperature resistance.

Similarly, the present invention may also be used to chemically bond an epoxy "top layer" to a polycarbonate member. Such an application is depicted in FIG. 1 wherein a sheet of polycarbonate 10 is coated with a layer of catalyst 12 and epoxy resin 14 (having either mono or multifunctional epoxides). As a result of the chemical reaction described herein, epoxy layer 14 will chemically bond to polycarbonate sheet 10 within the transition layer 14 which contains the mixture of catalyst, polycarbonate and epoxy reaction products thereby greatly improving the scratch or mar resistance of the polycarbonate.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of making a polymer by reacting, in the presence of a catalyst, epoxide groups of an epoxy resin with in-chain carbonate groups of polycarbonate or polycarbonate oligomers to chemically bond said epoxide groups to said carbonate groups to produce a polycarbonate-epoxy polymer, said catalyst being catalytically effective to promote chemical bonding between said epoxide groups and said in-chain carbonate groups to produce said polycarbonate-epoxy polymer.

2. The method of claim 1 wherein:
said epoxy resin includes multifunctional epoxide groups to produce a polycarbonate-epoxy polymer comprised of a three-dimensional polymeric network.

3. The method of claim 1 wherein:
said catalyst comprises at least one quarternary ammonium salt.

4. The method of claim 3 wherein:
said quarternary ammonium salt is selected from the group consisting of benzyltrimethylammonium chloride and tetrabutyl ammonium iodide.

5. The method of claim 1 wherein:
said catalyst comprises at least one of the catalysts selected from the group consisting of tertiary amines and metal alkoxides.

6. The method of claim 1 wherein:
said epoxy resin and said polycarbonate are reacted in a molar ratio of 2 moles of epoxide groups for each 1 mole of carbonate groups.

7. The method of claim 1 wherein:
said polycarbonate comprises a Bisphenol A polycarbonates and said epoxy resin comprises a Bisphenol A diglycidyl ether to produce a phenoxy polycarbonate copolymer network having a structure of phenoxy resin cross-linked through carbonate groups.

8. The product produced by the method of claim 1.
9. The product produced by the method of claim 2.
10. The product produced by the method of claim 7.
11. A method of making a polymer by reacting, in the presence of at least one of the catalysts selected from the group consisting of quarternary ammonium salts, tertiary amines and metal alkoxides, epoxide groups of an epoxy resin with in-chain carbonate groups of polycarbonate or polycarbonate oligomers to chemically bond said epoxide groups to said carbonate groups to produce a polycarbonate-epoxy polymer.

12. The method of claim 11 wherein:
said epoxy resin includes multifunctional epoxide groups to produce a polycarbonate-epoxy polymer comprised of a three-dimensional polymeric network.

13. The method of claim 11 wherein:
said quarternary ammonium salt is selected from the group consisting of benzyltrimethylammonium chloride and tetrabutyl ammonium iodide.

14. The method of claim 11 wherein:
said epoxy resin and said polycarbonate are reacted in a molar ration of 2 moles of epoxide groups for each 1 mole of carbonate groups.

15. The method of claim 11 wherein:
said polycarbonate comprises a Bisphenol A polycarbonate and said epoxy resin comprises a Bisphenol A diglycidyl ether to produce a phenoxy polycarbonate copolymer network having a structure of phenoxy resin cross-linked through carbonate groups.

16. The product produced by the method of claim 11.
17. The product produced by the method of claim 12.
18. The product produced by the method of claim 15.

19. A method of making a polymer by reacting, in the presence of at least one quarternary ammonium salt catalyst, epoxide groups of an epoxy resin with in-chain carbonate groups of polycarbonate or polycarbonate oligomers to chemically bond said epoxide groups to said carbonate groups to produce a polycarbonate-epoxy polymer.

20. The method of claim 19 wherein:
said epoxy resin includes multifunctional epoxide groups to produce a polycarbonate-epoxy polymer comprised of a three-dimensional polymeric network.

21. The method of claim 19 wherein:
said quarternary ammonium salt is selected from the group consisting of benzyltrimethylammonium chloride and tetrabutyl ammonium iodide.

22. The method of claim 19 wherein:
said epoxy and said polycarbonate are reacted in a molar ratio of 2 moles of epoxide groups for each 1 mole of carbonate groups.

23. The method of claim 19 wherein:
said polycarbonate comprises a Bisphenol A polycarbonate and said epoxy resin comprises a Bisphenol A diglycidyl ether to produce a phenoxy polycarbonate copolymer network having a structure of phenoxy resin cross-linked through carbonate groups.

24. The product produced by the method of claim 19.
25. The product produced by the method of claim 20.
26. The product produced by the method of claim 23.

* * * * *